United States Patent
Seolas et al.

(10) Patent No.: US 10,693,943 B2
(45) Date of Patent: *Jun. 23, 2020

(54) CONFIGURING TAGS TO MONITOR OTHER WEBPAGE TAGS IN A TAG MANAGEMENT SYSTEM

(71) Applicant: ObservePoint Inc., Provo, UT (US)

(72) Inventors: Robert K Seolas, Alpine, UT (US); Alan Martin Feuerlein, Orem, UT (US); Matthew T Miller, Provo, UT (US); John Pestana, Orem, UT (US); Clinton C Eagar, Orem, UT (US)

(73) Assignee: OBSERVEPOINT LLC, Orem, UT (US)

( * ) Notice: Subject to any disclaimer, the term of this patent is extended or adjusted under 35 U.S.C. 154(b) by 258 days.

This patent is subject to a terminal disclaimer.

(21) Appl. No.: 15/232,617

(22) Filed: Aug. 9, 2016

(65) Prior Publication Data

US 2016/0352806 A1 Dec. 1, 2016

Related U.S. Application Data

(63) Continuation of application No. 13/890,894, filed on May 9, 2013, now Pat. No. 9,412,115.

(60) Provisional application No. 61/785,470, filed on Mar. 14, 2013.

(51) Int. Cl.
*G06Q 30/02* (2012.01)
*G06F 16/958* (2019.01)
*H04L 29/08* (2006.01)
*H04L 29/06* (2006.01)

(52) U.S. Cl.
CPC .......... *H04L 67/025* (2013.01); *G06F 16/958* (2019.01); *G06Q 30/0201* (2013.01); *H04L 67/42* (2013.01)

(58) Field of Classification Search
CPC .................................................. G06F 17/3089
USPC ......................................................... 715/234
See application file for complete search history.

(56) References Cited

U.S. PATENT DOCUMENTS

| | | |
|---|---|---|
| 6,792,458 B1 | 9/2004 | Muret |
| 6,804,701 B2 | 10/2004 | Muret |
| 7,610,289 B2 | 10/2009 | Muret |
| 7,849,202 B2 | 12/2010 | Muret |
| 8,032,564 B2 | 10/2011 | Muret |
| 8,150,983 B2 | 4/2012 | Muret |
| 8,261,362 B2 | 9/2012 | Goodwin |
| 8,429,243 B1 | 4/2013 | Wang |
| 8,516,601 B2 | 8/2013 | Goodwin |
| 8,554,804 B2 | 10/2013 | Muret |

(Continued)

OTHER PUBLICATIONS

Bowman, Laura J. "Pulling back the curtain: Online consumer tracking." ISJLP 7 (2011): 721. (Year: 2011).*

(Continued)

*Primary Examiner* — Frank D Mills
(74) *Attorney, Agent, or Firm* — Workman Nydegger (57) ABSTRACT

Methods and systems allow for using a master tag to monitor and control other tags on a webpage can include identifying a webpage. The method can also include identifying, with a master tag embedded in the webpage, one or more characteristics of at least one other tag embedded within the webpage. Further, the method can include sending a report to a data store that identifies the one or more characteristics of the at least one other tag.

20 Claims, 4 Drawing Sheets

(56) References Cited

U.S. PATENT DOCUMENTS

| | | |
|---|---|---|
| 8,555,391 B1 | 10/2013 | Demir |
| 8,640,037 B2 | 1/2014 | Goodwin |
| 8,683,051 B2 | 3/2014 | Muret |
| 8,683,056 B2 | 3/2014 | Muret |
| 8,805,946 B1 | 8/2014 | Gommen |
| 8,843,827 B2 | 9/2014 | Koo |
| 8,904,278 B1 | 12/2014 | Anderson |
| 8,990,298 B1 | 3/2015 | Anderson |
| 8,996,986 B2 | 3/2015 | Manion |
| 8,997,081 B1 | 3/2015 | Manion |
| 9,003,552 B2 | 4/2015 | Goodwin |
| 9,081,789 B2 | 7/2015 | Anderson |
| 9,116,608 B2 | 8/2015 | Koo |
| 9,165,308 B2 | 10/2015 | Cook |
| 9,185,016 B2 | 11/2015 | Muret |
| 9,203,905 B1 | 12/2015 | Hong |
| 9,219,787 B1 | 12/2015 | Manion |
| 2004/0187076 A1* | 9/2004 | Ki ................... H04L 29/06 715/208 |
| 2006/0136294 A1* | 6/2006 | Linden ............. G06Q 30/0257 705/14.47 |
| 2008/0040473 A1 | 2/2008 | Arsson |
| 2008/0114875 A1 | 5/2008 | Anastas |
| 2008/0275980 A1 | 11/2008 | Ansen |
| 2009/0164884 A1* | 6/2009 | Watson ............. G06F 16/972 715/234 |
| 2009/0287713 A1 | 11/2009 | Anderson |
| 2010/0030792 A1* | 2/2010 | Swinton ............. G06Q 30/00 705/14.54 |
| 2010/0281008 A1 | 11/2010 | Braunwarth |
| 2010/0318976 A1* | 12/2010 | Everly ............... H04L 67/22 717/141 |
| 2011/0035486 A1 | 2/2011 | Seolas |
| 2011/0041090 A1 | 2/2011 | Seolas |
| 2011/0106634 A1 | 5/2011 | Luttrell |
| 2011/0119220 A1 | 5/2011 | Seolas |
| 2011/0125587 A1 | 5/2011 | Netzer |
| 2011/0125593 A1 | 5/2011 | Wright |
| 2011/0153796 A1 | 6/2011 | Branson |
| 2011/0185016 A1* | 7/2011 | Kandasamy ........ G06Q 10/06 709/203 |
| 2011/0191664 A1 | 8/2011 | Sheleheda |
| 2011/0271175 A1 | 11/2011 | Lavi |
| 2011/0314092 A1* | 12/2011 | Lunt ................. G06Q 30/02 709/203 |
| 2012/0054143 A1* | 3/2012 | Doig ............... G06Q 30/0243 706/47 |
| 2012/0209987 A1 | 8/2012 | Rhinelander |
| 2013/0073401 A1* | 3/2013 | Cook ................. G06Q 30/02 705/14.73 |
| 2013/0290480 A1 | 10/2013 | Manion |
| 2013/0297775 A1 | 11/2013 | Hong |
| 2013/0297776 A1 | 11/2013 | Hong |
| 2013/0297777 A1 | 11/2013 | Hong |
| 2013/0297778 A1 | 11/2013 | Hong |
| 2014/0041048 A1 | 2/2014 | Goodwin |
| 2014/0089782 A1 | 3/2014 | Cook |
| 2014/0137006 A1 | 5/2014 | Goodwin |
| 2014/0156738 A1 | 6/2014 | Muret |
| 2014/0208216 A1 | 7/2014 | Koo |
| 2015/0066587 A1 | 3/2015 | Gommen |
| 2015/0213282 A1 | 7/2015 | Goodwin |
| 2015/0295988 A1 | 10/2015 | Goodwin |
| 2016/0004673 A1 | 1/2016 | Cook |

OTHER PUBLICATIONS

Chen, Chia-Mei, Wan-Yi Tsai, and Hsiao-Chung Lin. "Anomaly behavior analysis for web page inspection." In 2009 First International Conference on Networks & Communications, pp. 358-363. IEEE, 2009. (Year: 2009).*

Daddy-o, "Prevent Nested Execution of a Custom Tag" [online] published Apr. 15, 2009. Retrived from: http://www.cfelements.com/2009/04/prevent-nested-execution-of-custom-tag.html.

Kals, Stefan, Engin Kirda, Christopher Kruegel, and Nenad Joyanoyic. "Secubat: a web vulnerability scanner." in Proceedings of the 15th International conference on World Wide Web, pp. 247-256. ACM, 2006.

International Search Report and Written Opinion for PCT/US14/25427 dated Oct. 1, 2014.

Office Action for 13/890,894 dated Aug. 27, 2015.

Final Office Action for U.S. Appl. No. 13/890,894 dated Feb. 8, 2016.

Notice of Allowance for U.S. Appl. No. 13/890,984 dated Jun. 16, 2016.

* cited by examiner

CONFIGURING TAGS TO MONITOR OTHER WEBPAGE TAGS IN A TAG MANAGEMENT SYSTEM

CROSS-REFERENCE TO RELATED APPLICATIONS

The present invention is a continuation of U.S. patent application Ser. No. 13/890,894, filed May 9, 2013, now U.S. Pat. No. 9,412,115 issued on Aug. 9, 2016, which claims the benefit of priority to U.S. Provisional Patent Application No. 61/785,470, filed on 14 Mar. 2013, entitled "CONFIGURING TAGS TO MONITOR OTHER WEBPAGE TAGS IN A TAG MANAGEMENT SYSTEM." The entire content of each of the foregoing applications is incorporated herein by reference.

BACKGROUND OF THE INVENTION

1. The Field of the Invention

The entire content of the aforementioned patent application is incorporated herein by reference.

2. The Relevant Technology

As the Internet and the accompanying Internet commerce have expanded, various website owners have sought to track a variety of data about individuals who visit their websites. In particular, website owners often wish to gather a variety of different analytic data about the visitors who view their webpage. In many cases, this analytic data can be used to determine what advertisements to display to a visitor and to determine what fees are due to be paid to various external advertisers.

One conventional method for generating analytic data on website visitors is through the use of tags. In at least one conventional form, a tag is a hidden element within a webpage that causes some action to occur on a webpage when it is fired. In particular, in at least one implementation, a tag is a piece of code that is placed within a webpage and allows a webpage owner to track information about the visitors who download and execute the particular piece of code. For example, a tag can comprise a transparent GIF or a tracking pixel, which is placed within the code of a webpage. The actual transparent GIF or tracking pixel can be stored on a separate server from the actual webpage. The tag is fired when the browser requests the transparent GIF or tracking pixel from the separate server. When the separate server receives the request from the browser, the server can gather various analytic data about the requestor.

Once executed, a tag can gather information such as where the visitor came from (e.g., what webpage or search engine), what keywords were used to find the webpage, whether a particular advertisement directed a visitor to the page, and other related data. In many situations, a webpage can comprise multiple tags from a variety of different parties. For example, a particular webpage may contain a Google Analytics tag, a Facebook tag, a page-counter Tag, a weather tag, and other common tags.

In order for the analytic data gathered by tags to be complete, websites with a large number of pages may require tags on every single page. In some cases, if a page is missing a particular tag, then analytic information associated with that particular tag will not be gathered for the page. Additionally, some tags may become outdated or may be deemed a security risk. In these cases, the tags must be removed from every individual page within the website. As the number of tags and the size of websites increase, managing the tags contained within a website has become an unwieldy task.

One development to help with issues relating to the control of tags within websites has been the implementation of tag management systems. Conventional tag management systems function by replacing the plurality of individual tags on a webpage with a single master tag (in some implementations, referred to as a "container tag"). When a user loads the master tag, the tag management system identifies, using a set of rules, which of the plurality of individual tags should be allowed to run on the webpage. The tag management system can then inject the identified tags into the webpage through the master tag.

A properly implemented tag management system can provide the benefits of, among other things, only requiring a single tag to be implemented on each page of a website and providing a single interface through which all of the tags can be controlled. In practice, however, it can be difficult to implement a tag management system within a website that has previously placed tags within its pages. In particular, it can be difficult to determine what rules should be applied to each individual page within a website in order to ensure that a tag management system associates the correct tags with each individual page.

Additionally, in at least some cases, after implementing a single master tag on each page of a website, each of the original tags may require manual removal from each of the webpages in the website. The process of gathering information about what tags are present on individual webpages and then removing those tags prior to the implementation of a tag management system can be a very costly and time consuming undertaking.

Accordingly, there are a number of problems in the art relating to the creation of rules for a tag management system that can be addressed.

BRIEF SUMMARY OF THE INVENTION

Implementations of the present invention overcome one or more problems in the art with systems, methods and apparatus configured to use a master tag to identify other tags that are embedded within a webpage and manipulate the execution of those tags. In particular, a master tag can communicate with a server that aids in identifying other tags within the webpage and provides the master tag with directions about the management of the other tags. Additionally, a master tag can aid in the generation of a report that outlines the various tags that are located within a webpage and provides characteristics about at least some of the tags.

For example, a method in accordance with at least one implementation of using a master tag to monitor and control other tags on a webpage can include identifying a webpage. The method can also include identifying, with a master tag embedded in the webpage, one or more characteristics of at least one other tag embedded within the webpage. Further, the method can include sending a report to a data store that identifies the one or more characteristics of the at least one other tag.

In an additional or alternative implementation, a method for using a master tag to monitor and control other tags on a webpage can include identifying, using a master tag embedded within a source code of a webpage, one or more characteristics of at least one other tag within the webpage. The method can also include communicating, using the embedded master tag, information about the identified at least one other tag with a first server. Additionally, the method can include receiving, from the first server, instructions relating to the at least one other tag. Further, the method can include manipulating, with the embedded master tag, the execution of the at least one other tag to comply with the instructions received from the first server.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Implementations of the present invention extend to systems, methods and apparatus configured to use a master tag to identify other tags that are embedded within a webpage and manipulate the execution of those tags. In particular, a master tag can communicate with a server that aids in identifying other tags within the webpage and provides the master tag with directions about the management of the other tags. Additionally, a master tag can aid in the generation of a report that outlines the various tags that are located within a webpage and provides characteristics about at least some of the tags.

For example, at least one implementation of the present invention embeds a master tag within a webpage. The master tag can then monitor and control the execution of other tags that are also embedded within the webpage. Within this application, a master tag is defined as a tag that can identify one or more tags that are embedded within the same webpage as the master tag and exert at least some control over those one or more tags.

The master tag can communicate with a master tag server. For example, the master tag can communicate to the master tag server that a particular tag is present on the webpage. The master tag server can then communicate instructions to the master tag. For example, the master tag server can communicate to the master tag that the particular tag should be prevented from executing. In response to the communication from the master tag server, the master tag can then prevent the particular tag from being executed.

Additionally, in at least one implementation, the master tag can aid in the development of a set of rules for a tag management system. Specifically, the master tag can identify the other tags that are present on a webpage and the characteristics of those tags. The master tag can communicate this information to the master tag server. The master tag server can receive information from a plurality of master tags that are embedded on each webpage of a website. The master tag server can use this information to generate a set of rules for a tag management system, such that a tag management system could substantially replicate the tags within each respective webpage.

One will appreciate the benefits of the present invention in generating rules for a tag management system. Within conventional systems, generating rules for a tag management system can be a time consuming and resource intensive undertaking. In particular, a website administrator may be required to manually analyze every individual webpage within a website and determine what tags are present and the characteristics of each of the tags. Within the present invention, the master tag can relieve a website administrator of this burden by automatically determining at least a portion of other tags that are present on the webpage and at least a portion of the characteristics of each tag.

Additionally, in at least one implementation, the master tag can communicate with a tag management system. The tag management system can direct the master tag to allow specific tags to fire, or in the alternative to prevent specific tags from firing. Further, in at least one implementation, the master tag can act as a wrapper that wraps specific tags and allows the specific tags to fire.

Accordingly, one will appreciate in view of the specification and claims herein that at least one implementation of the present invention utilizes master tags to analyze and control other tags on a webpage. Specifically, at least one implementation of the present invention uses master tags to identify the configuration of tags that are implemented within a webpage and create rules that will enable a tag management system to replicate the current configuration of the tags within the website. Additionally, in at least one implementation, the master tags of the present invention can receive rules from a tag management system, and enforce the rules on the website. One will understand that the automated generation of tag rules for a tag management system can result in a tremendous time and cost savings.

Figure 1:
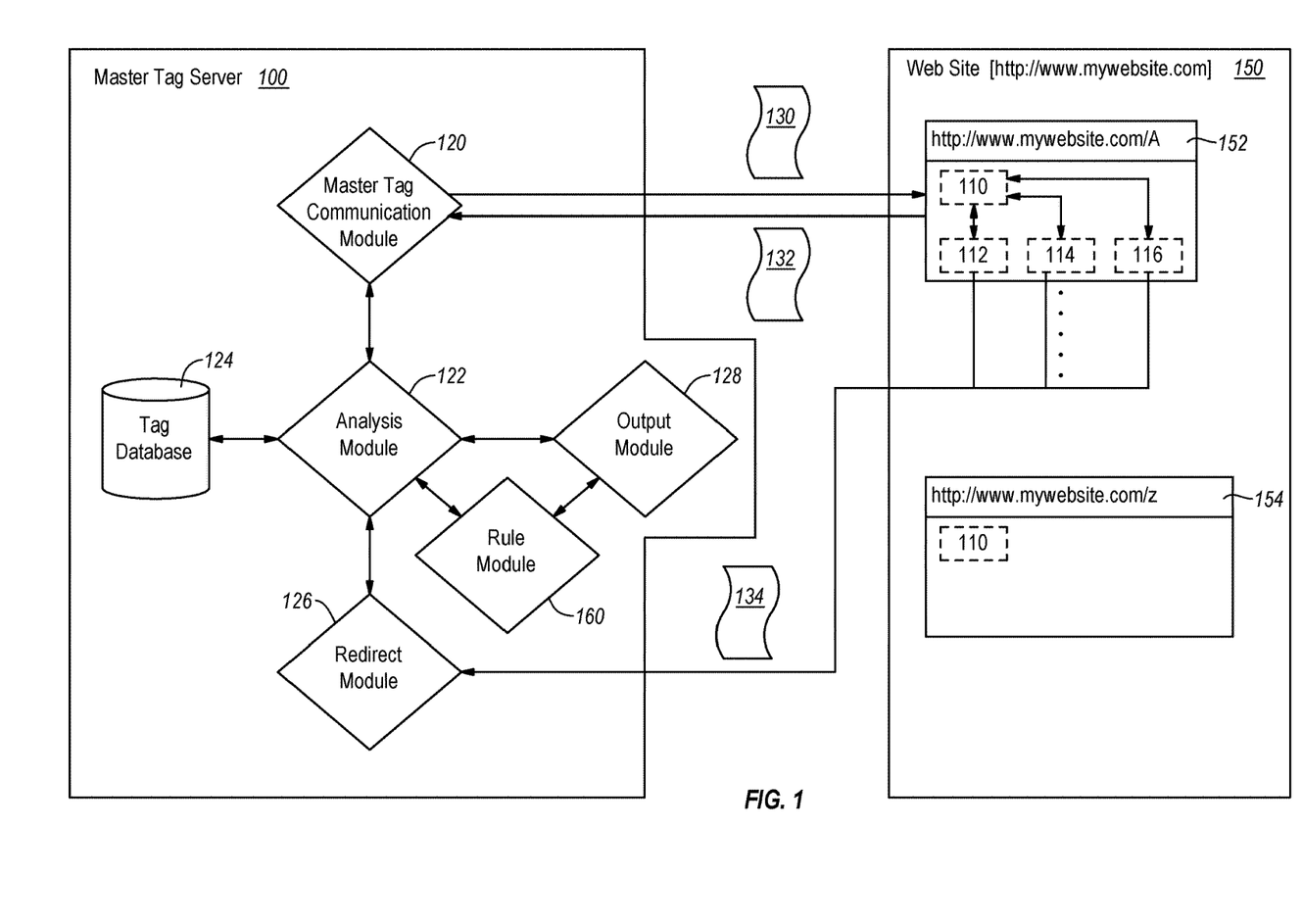
FIG. 1 illustrates an architectural schematic diagram of a system for using a master tag to monitor and control other tags on a website.

FIG. 1 illustrates an architectural schematic diagram of a system for using a master tag to monitor and control other tags on a website. For example, FIG. 1 shows a master tag server 100 that is in communication with a website 150. In particular, the master tag server 100 can be in communication with a master tag 100 that is embedded within a webpage 152, 154 of the website 150. Additionally, in at least one implementation, the master tag server 100 can comprise a tag management system.

As depicted in FIG. 1, the master tag server 100 comprises a master tag communication module 120, an analysis module 122, a tag database 124, a redirect module 126, an output module 128, and a rule module 160. Additionally, as depicted in FIG. 1, the website 150 comprises a plurality of webpages 152, 154. Further, at least a portion of the webpages include one or more tags 110, 112, 114, 116, of which tag 110 is a master tag 110.

In at least one implementation, a master tag 110 can be embedded into one or more of the webpages 152, 154 within a website 150. One or more of the webpages 152, 154 may comprise additional tags 112, 114, 116, in addition to the master tag 110. As illustrated in FIG. 1, tags 110, 112, 114, 116 are depicted as dashed boxes within each respective webpage 152, 154. One will understand, however, that the boxes are depicted for the sake of clarity and that the actual tags are embedded within the source code of each webpage 152, 154.

In addition, one will understand that in the present application, a master tag 110 is a unique piece of source code that can be embedded within a particular webpage 152, 154. Each webpage 152, 154 within a website 150 can comprise a master tag 110. In this application, "a master tag" 110 can refer to a generic master tag 110 on any page 152, 154 of a website 150. In contrast, "the master tag" 110 may refer to a specific master tag 110 on a specific webpage 152. The use of "a master tag" versus "the master tag" should not be interpreted as limiting the number or arrangement of master tags 100, but is merely used to more clearly demonstrate the present invention in particular situations versus in general situations.

In at least one implementation of the present invention, the master tag server 100 can send data 130 to and receive data 132 from each master tag 110 embedded within each respective webpage 152, 154. For example, the master tag server 100 and each respective master tag 110 can exchange data relating to the identification and control of the other tags 112, 114, 116 within each respective webpage 152, 154.

Additionally, in at least one implementation, the master tag 110 fires before any other tags 112, 114, 116. In particular, if the master tag 110 fires before the other tags 112, 114, 116 it can monitor the other tags before and while they execute. For example, in at least one implementation the master tag 110 can fire and cause that an interface layer, or monitoring module, be implemented through which the webpage is rendered. In at least one implementation, the entire webpage may be rendered through the interface layer. In another implementation, only the source code that is subsequent to the master tag 110 is rendered through the interface layer.

In at least one implementation, the master tag 110 can use the interface layer, or monitoring module, to filter the source code before the source code is rendered. For example, the master tag can identify, through the interface layer, an undesirable tag in the source code and prevent that code from executing. One will understand that implementing an interface layer, through which a web page is rendered, can provide a significant amount of control over the rendering of the webpage content.

Additionally, in at least one implementation, the master tag 110 only scans a webpage for other tags 112, 114, 116 at certain intervals. Specifically, the master tag 110 may only scan a webpage after a certain number of hits or on a scheduled time interval. In particular, limiting the times when the master tag 110 scans the webpage may increase the speed at which a webpage is able to render.

In at least one implementation, the master tag 110 sends data 132 to the master tag communication module 120 within the master tag server 100. Specifically, the master tag 100 can send data relating to the presence of other potential tags 112, 114, 116 on the same webpage as the master tag 110. Upon receiving the data from the master tag 100, the master tag communication module 120 can communicate the data 130 to the analysis module 122.

The analysis module 122 can then analyze the received data and identify whether other tags 112, 114, 116 exist within a particular webpage 152, 154. In at least one implementation, the analysis module 122 identifies the tags 112, 114, 116 that are associated with each webpage 152, 154 by referencing a tag database 124. In particular, the analysis module 122 can compare the data 132 received from a master tag 110 to all of the known tags within the tag database 124. For example, the master tag 110 may send to the master tag server 100 data relating to tag 112. The analysis module 122 can compare the received data 132 to known tags that are contained within the tag database 124. The tag database 124 may contain a signature of tag 112. Using the signature for tag 112 that is stored in the tag database 180, the analysis module 160 can identify that the particular webpage contains tag 112.

In at least one implementation, the signatures within the tag database 124 may be actual copies of the known tags. In another implementation, the signatures may be based upon specific attributes of tags, such that the analysis module identifies a tag by identifying the specific attributes within a portion of the data 130 received from a master tag 110.

In at least one implementation, the tag database 124 is frequently updated to reflect the most recent tags that are available. Additionally, in at least one implementation, custom tags can be added to the tag database 124. For example, a web administrator may desire to have their website analyzed according to a method of the present invention. The administrator, however, may be aware of a custom tag that appears on at least a webpage 152, 154 of the website 150. In at least one implementation, the administrator can provide sufficient information that the custom tag can be added to the tag database 124. Once added to the database 124, a master tag 110 and the analysis module 122 can proceed as described and identify the tags associated with the webpage of the website 152, 154, including the custom tag.

Additionally, in at least one implementation, the tag database 124 may also contain characteristics that are associated with each tag. For example, the data database may contain information about the variables, if any, that are commonly associated with specific tags. In addition, the tag database 124 may also contain information about past version of tags, such that the analysis module 124 can identify whether a particular tag is up-to-date. Further, in at least one implementation, the tag database 124 may contain information that enables the analysis module 124 to identify undesirable tags (e.g., tags that are deemed unsecure, tags that steal user information, etc.).

After identifying at least one tag, the analysis module 122 can communicate with the rule module 160. Specifically, in at least one implementation, the analysis module 122 communicates the tag identity, configuration, and associated webpage to the rule module 160. For example, the analysis module 122 may communicate to the rule module 160, that tag 112 is present on webpage 152 "http://www.mywebsite.com/A." Further, the analysis module 122 may communicate to the rule module 160 any variables that are associated with the tag.

In some implementations, tags associated with variables provide additional functionality than tags that are not associated with variables. For example, a tag associated with a variable may have the functionality to only fire on the first page of a particular user session. Similarly, a tag associated with a variable may be able to determine whether a website visitor originated from a particular advertising campaign. In at least one implementation, the variable that a tag is associated with may comprise a browser cookie. One will understand that associating variables with a tag can provide a website administrator with valuable data gathering tools.

In at least one implementation, the rule module 160 may not be able to create rules that fully characterize a particular tag 112, 114, 116. For example, a particular tag may rely upon variables that are external to the website 150 (e.g., a cookie). In this case, in at least one implementation, the rule module 160 can create an incomplete rule by not fully characterizing the tag. A user may then have to go through the rules manually and finish characterizing the tag. In another implementation, the rule module 160 can notify a user that additional information is needed to fully characterize a particular tag. An interface can be provided to a user prompting the user to provide the additional information.

After receiving tag information from the analysis module 122, the rule module 160 can generate a rule that enables a tag management system to replicate the tag configuration of the website 150. Continuing the example from above, the rule creation module 170 can create a rule that associates the particular tag 112 with "http://www.mywebsite.com/page1" 152.

In at least one implementation, the rule module 160 creates rules on a page-by-page basis. For example, the rule module 160 can create the following rule to show that a particular webpage 152 includes three tags 112, 114, 116: "http://www.mywebsite.com/A includes tag 112, tag 114, tag 116". One will understand, however, that the provided rule is merely exemplary and that a number of different rule formats can be used and still remain within the scope of the present invention.

In particular, in at least one implementation, the rule module 160 can be configured to communicate the generated rules to the output module 128. The output module 128 can export a rule file in a format that is readable by a particular tag management system. Similarly, in at least one implementation, the rule module 160 is configurable to export the rule file in a variety of formats that correspond to different commercial tag management system.

In contrast, in at least one implementation, the rule creation module 160 only generates rule files in a single format that is proprietary to the present invention. In this embodiment, the various tag management systems may need to be configured to read the proprietary format. In either implementation, the rule creation module 160 is capable of generating a rule file based upon information received from the analysis module 122.

Further, in at least one implementation, a user can manually create or adjust rules. For example, a use may wish to place a specific tag (not shown) within webpage 152. To do so, the user can manually create a rule that places the specific tag on webpage 152. Similarly, if a user desires to remove tag 112 from webpage 152, the user could manually change the rule to remove the tag 112 from the webpage 152.

Additionally, in at least one implementation of the present invention, a tag management system can use the rules when communicating with the master tag 110. Specifically, in at least one implementation of the present invention, the master tag server 100 can also function as a tag management system. In particular, the rule module 160 can communicate rules to the analysis module 122, which can in turn communicate instructions to the master tag communication module 120. The master tag communication module 120 can then communicate the instructions to each master tag 110.

For example, in at least one implementation, the communication module 120 can direct the master tag 110 to manipulate the execution of the other tags 112, 114, 116 on the webpage 152. For example, the communication module 120 can direct the master tag 110 on webpage 152 to prevent tags 112, 114, and 116 from firing. In at least one implementation, the master tag 110 can prevent the other tags 112, 114, 116 from firing by injecting a string into the source code of the other tags 112, 114, 116. Additionally, in at least one implementation, the master tag 110 can delete the other tags 112, 114, 116 from the source code the webpage 152.

Further, in at least one implementation, the communication module can instruct the master tag 110 to redirect the communications of another tag 112, 114, 116 to communicate with the redirect module 126 of the master tag server 100. Oftentimes, tags 112, 114, 116 operate by communicating with a server that is external to the website 152. The external server can use these communications to gather information about individuals who visit a particular website 150. It may be desirable to identify the information that is being communicated by the tags 112, 114, 116 to their respective external servers. In at least one implementation, when the master tag 110 redirects the communications of another tag 112, 114, 116 it prevents the tag from communicating with the external server. In contrast, in at least one implementation, the master tag 110 can mirror the communications of the other tags 112, 114, 116 such that the same communications 134 are going both to the external server and the redirect module 126.

In at least one implementation, once the master tag 110 has redirected the communications of other tags 112, 114, 116 to communicate with the redirect module 126, the redirect module can transmit the received data 134 to the analysis module 122. The analysis module 122 can then analyze the received data 134 and determine various attributes of the data 134. In at least one implementation, the tag database 124 can contains information relating to the communication characteristics of a variety of different tags. The analysis module 122 can identify attributes of the received data 134 by comparing the received data 134 to the information contained in the tag database 124. For example, the analysis module 122 may identify the tag that originally sent the information, whether any personal information was sent, and what information the external server was attempting to gather.

In addition to the above recited methods of data gathering and tag control, a master tag 110 can also be used to selectively allow other tags 112, 114, 116 to fire. For example, in at least one implementation, the master tag communication module 120 can send a communication 132 to the master tag 110, directing the master tag 110 to allow tags 112, 114, and 116 to fire. Similarly, the master tag 110 can receive instructions to prevent tag 112 from firing while allow tags 114 and 116 to fire.

Further, in at least one implementation, the master tag 110 can act as a wrapper through which the other tags 112, 114, 116 fire. In at least one implementation, the master tag 110 can wrap the source code of the other tags 112, 114, 116 from within the webpage 152. In another implementation, the master tag 110 can prevent one or more of the tags 112, 114, 116 from firing. The master tag 110 can then receive copies of the tags 112, 114, 116 from the master tag communication module 120, and wrap the copies of the tags 112, 114, 116. The tags 112, 114, 116 can then fire from within the wrapper of master tag 110.

In the methods recited above, a master tag 110 enables a tag management system to efficiently monitor a website 150 without requiring that every tag 112, 114, 116 within the website 150 be removed. In at least one implementation, the master tag 110 is able to selectively control the tags 112, 114, and 116 that are present within each of the webpages 152, 154 of the website 150. Additionally, at least one implementation, provides continual monitoring of tags 112, 114, 116 of a website 150 after a tag management system has been implemented.

For example, a website 150 ran by a large corporation may have millions of individual webpages 152, 154, and thousands of content generators that place information, including tags, within the website 150. While the corporation may have strict rules about what tags may be placed within the webpage, an individual may violate the rules by placing an banned tag on one of the webpages 152, 154. In at least one implementation, a master tag 110 will recognize the banned tag and report it to the master server 100. The master server 100 can then direct the master tag 110 to prevent the tag from firing. Additionally, the analysis module 122 can communicate with the output module 128 and generate a report about the presence of the banned tag.

Additionally, in at least one implementation, the output module 128 can generate a plurality of different reports. For example, the output module 128 can generate reports relating to the rules that are being used by the tag management system, the tags that are present within a particular website 150, or any changes that have occurred to the tags website 150 over a specified period of time.

One will appreciate that the master tag 110 of the present invention can streamline the management of a website 150. In particular, the master tag 110 can act as a manager of tags within a webpage and as a security device. In at least one implementation, the master tag can automatically identify problematic tags and stop the tag from firing and generate a report on the problematic tag.

Figure 2:
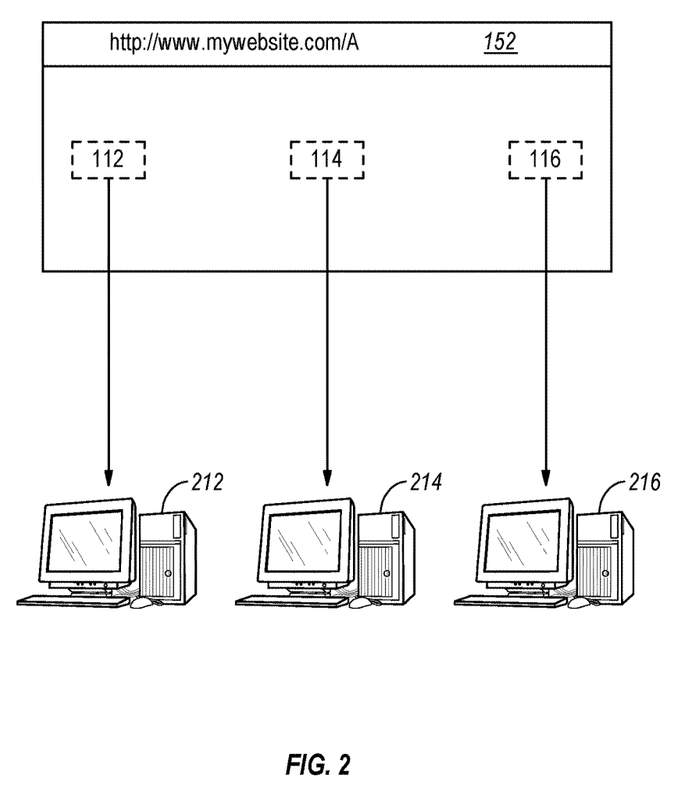
FIG. 2 illustrates a depiction of a webpage in communication with a plurality of servers.

For example, FIG. 2 depicts the webpage 150 of FIG. 1 in communication with a plurality of servers 212, 214, 216. In particular, tag 112 is in communication with external server 212, tag 114 in communication with external server 214, and tag 116 in communication with external server 216. As described above, in many cases each tag 112, 114, 116 on a webpage 150 communicates with an external server 100, 212, 214, 216. As the tags fire and communicate with the external servers 212, 214, 216, the external server can gather data about individuals who view a particular webpage 152.

In the implementation depicted by FIG. 2, a master tag 110 has not been embedded within the webpage 152. Additionally, a tag management system is not controlling the managing the tags 112, 114, 116. As depicted, the tags 112, 114, 116 fire when they are loaded. Additionally, the tags 112, 114, 116 communicate to their respective external servers 212, 214, 216 each time they fire.

Figure 3:
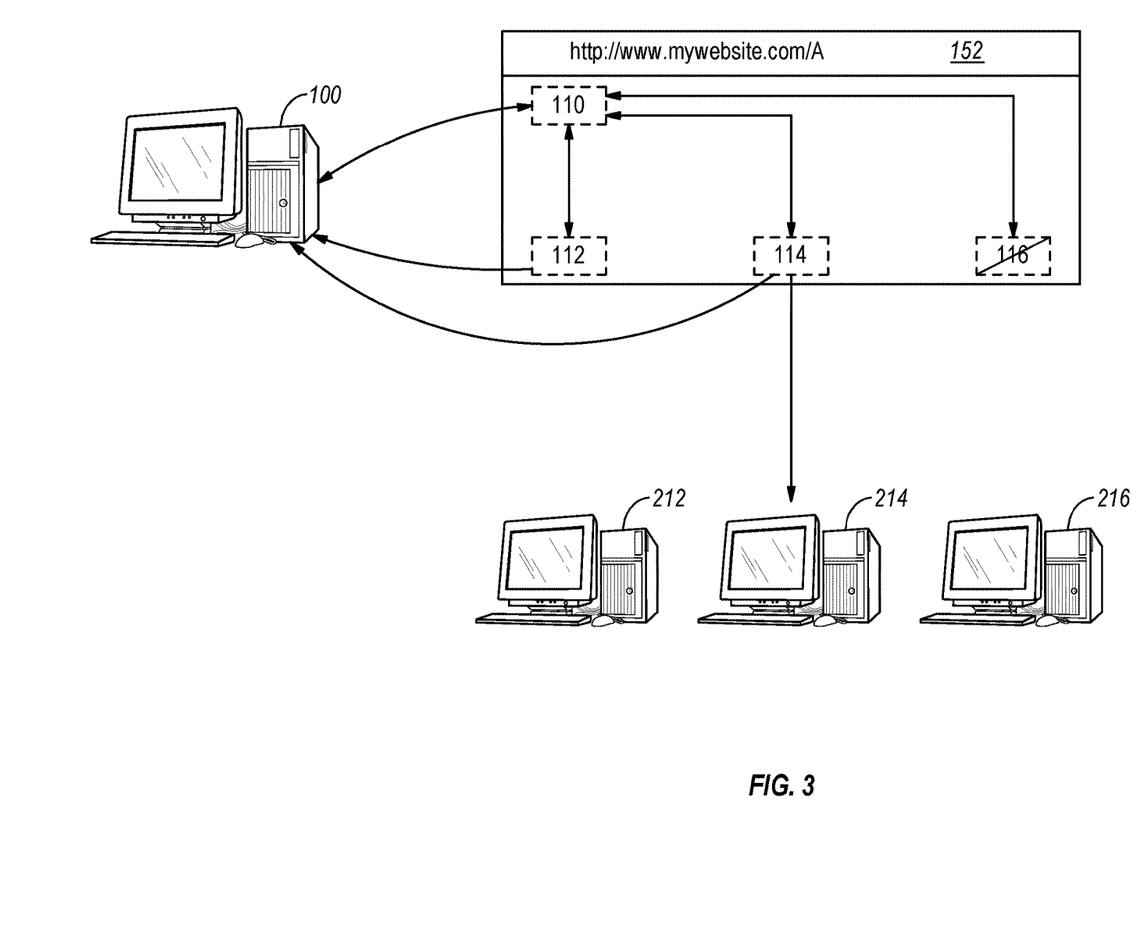
FIG. 3 illustrates another depiction of a webpage in communication with a plurality of servers.

In contrast, FIG. 3 illustrates another depiction of webpage 150 in communication with a plurality of servers 100, 212, 214, 216. In this depiction, the website 150 now includes a master tag 110, in addition to the other tags 112, 114, 116. The webpage 150 of FIG. 3 is being managed by the tag management system.

In at least one implementation, the master tag 110 has received instructions from a tag management system (in this implementation the master tag server 100). For example, the master tag 110 has received instructions to prevent tag 116 from firing. The master tag 110 may have previously communicated with master tag server regarding tag 116. The analysis module 122 may have identified tag 116 as being out-of-date, insecure, a banned tag, etc. The analysis module 122 can then direct the master tag 110 to prevent the identified tag 116 from firing, and thus prevent any information from being communicated to external server 216.

Additionally, in at least one implementation, the master tag 110 has received instruction to mirror the communications from tag 114 to the master tag server 100, while allowing the tag 144 to continue to communicate with external server 214. In at least one implementation, the analysis module 122 may have identified tag 114 as being a tag that should be allowed to fire, but a webpage administrator may also desire to audit the information that is being transmitted by tag 114. For example, a web administrator may want to know whether the tag 114 is communicating with any cookies. As the master tag server gathers data, the output module 128 can generate reports detailing what information is being transmitted by tag 114.

Further, in at least one implementation, the master tag 110 has received instruction to redirect the communications from tag 112 to the master tag server 100. In particular, the master tag 110 can prevent tag 112 from communicating with external server 212. In at least one implementation, the analysis module 122 may have identified tag 112 as a banned tag, but a web administrator may want to determine what information the tag 112 attempts to communicate to external server 212.

In another implementation, the analysis module 122 may be unable to determine the identity of tag 112. In this case, the analysis module 122 may instruct the master tag 110 to redirect the communications of tag 112 in order to more closely analyze the characteristics of the tag 112, while at the same time preventing any potential loss of data by preventing the tag 122 from communicating with external server 212.

Accordingly, FIGS. 1-3 and the corresponding text illustrate or otherwise describe one or more components, modules, and/or mechanisms for automatically using a master tag to monitor and control other tags on a website. In particular, in at least one implementation, the present invention can implement a tag management system on a website without requiring the removal of other tags from each webpage. Additionally, in at least one implementation, a master tag can provide continuous auditing of tags placed within the webpage of a website. In particular, the master tag can identify the introduction of new tags into a webpage. One will appreciate that implementations of the present invention can also be described in terms of flowcharts comprising one or more acts for accomplishing a particular result. For example, FIGS. 4 and 5 and the corresponding text describe acts in a method for creating rules for tag management system. The acts of FIGS. 4 and 5 are described below.

Figure 4:
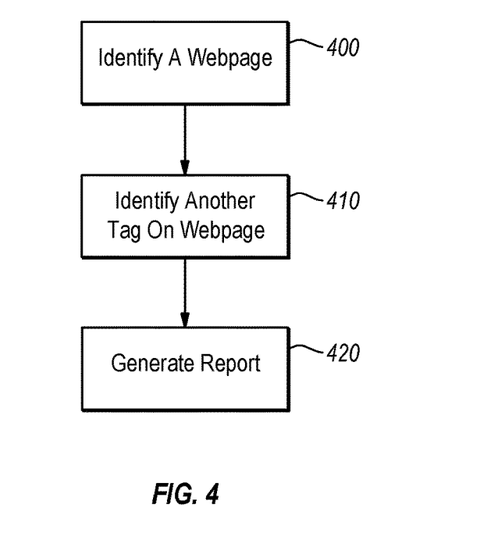
FIG. 4 illustrates a flow chart of a series of acts in a method in accordance with an implementation of the present invention for using a master tag to monitor and control other tags on a website.
Figure 5:
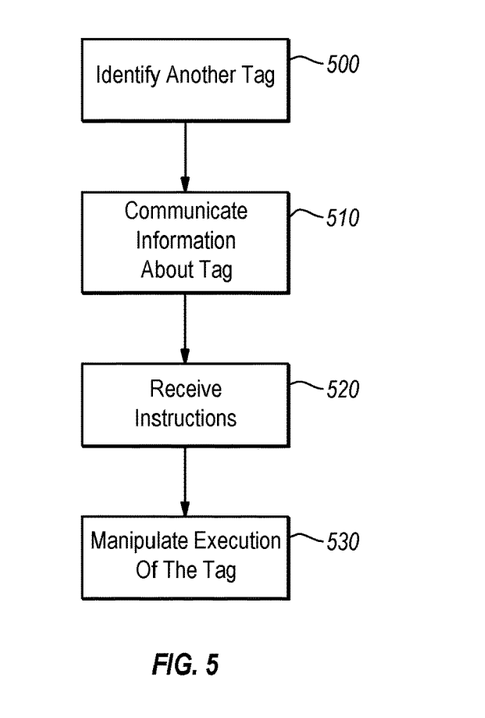
FIG. 5 illustrates another flow chart of a series of acts in a method in accordance with an implementation of the present invention for using a master tag to monitor and control other tags on a website.

For example, FIG. 4 illustrates that a method for using a master tag 110 to monitor and control other tags 112, 114, 116 on a website 150 can include Act 400 of identifying a webpage. For example, FIG. 1 shows the master tag 110 identifying webpage 152.

FIG. 4 also shows that the method can comprise act 410 of identifying another tag 112, 114, 116. Act 410 can include identifying, with a master tag embedded in the webpage, one or more characteristics of at least one other tag embedded within the webpage. For example, FIG. 1 shows master tag 110 identifying tags 112, 114, and 116 within webpage 150.

In addition, FIG. 4 shows that the method can include act 420 of generating a report. Act 420 includes sending a report to a data store that identifies the one or more characteristics of the at least one other tag. For example, FIG. 1 shows an output module 128 which can generate reports for a user. One will understand that output module 128 can include a data store to store data between report generation.

Additionally, FIG. 5 illustrates that a method for using a master tag to monitor and control other tags on a website can include Act 500 of identifying another tag. Act 500 can include identifying, using a master tag embedded within a source code of a webpage, one or more characteristics of at least one other tag within the webpage. For example, FIG. 1 shows master tag 110 identifying characteristics about tags 112, 114 and 116.

FIG. 5 also shows that the method can comprise Act 510 of communicating information about a tag. Act 510 includes communicating, using the embedded master tag, information about the identified at least one other tag with a first server. For example, FIG. 1 shows Master tag 110 communicating 130 with the master tag server 100.

In addition, FIG. 5 shows that the method can comprise Act 520 of receiving instructions. Act 520 includes receiving, from the first server, instructions relating to the at least one other tag. For example, FIG. 1 shows the master tag 110 receiving instructions 132 from the master tag server 100.

Further, FIG. 5 shows that the method can comprise Act 530 of manipulating the execution of the tag. Act 530 includes manipulating, with the embedded master tag, the execution of the at least one other tag to comply with the instructions received from the first server. For example, FIG. 3 shows master tag 110 manipulating the execution of tags 112, 114, and 116 (compare to FIG. 2).

Accordingly, FIGS. 1-5 provide a number of components, schematics, and mechanisms for using a master tag to monitor and control other tags on a webpage. Additionally, one or more implementations allow a tag management system to control the tags of a webpage through the master tag. One will appreciate that the components and mechanisms described herein can greatly simplify the implementation of a tag management system and the auditing of tags within a website. For example, the components and mechanisms described herein implement a tag system and continually monitor the tags within the website without requiring that other tags be removed.

The embodiments of the present invention may comprise a special purpose or general-purpose computer including various computer hardware components, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A computer system for using a master tag to monitor and control other tags on a webpage comprising:
    one or more processors; and
    one or more computer-readable media having stored thereon executable instructions that when executed by the one or more processors configure the computer system to perform at least the following:
    identify a webpage hosted by a website;
    embed a master tag within the identified webpage;
    receive communications generated by the master tag at a master tag server;
    identify, with the embedded master tag, from the received communications one or more characteristics of at least one other tag embedded within the webpage;
    determine that the at least one other tag is banned from firing;
    execute, from within the webpage, the at least one other tag, wherein the at least one other tag is configured to communicate with an external server;
    redirect, from within the webpage, communications from the at least one other tag to a different server; and
    prevent the at least one other tag embedded within the webpage from communicating with the external server.

2. The computer system as recited in claim 1, wherein the executable instructions include instructions that when executed configure the computer system to:
    embed one or more additional master tags on one or more of the identified webpage or another webpage hosted by the website, wherein each embedded master tag constitutes part of a set of embedded master tags;
    receive communications generated by each of the embedded master tags in the set; and
    generate a set of rules for a tag management system hosted at the master tag server.

3. The computer system as recited in claim 2, wherein the generated rules of the tag management system enables the website to automatically recreate each tag of each webpage hosted at the website without manual analysis or intervention.

4. The computer system as recited in claim 1, wherein preventing the at least one other tag from executing comprises injecting a segment of code into a source code of the at least one other tag.

5. The computer system as recited in claim 1, wherein preventing the at least one other tag from executing comprises deleting at least a portion of a source code corresponding to the at least one other tag.

6. The computer system as recited in claim 1, wherein the executable instructions include instructions that are executable to configure the computer system to implement an interface layer through which the webpage is rendered, wherein the interface layer is implemented by the executed master tag.

7. The computer system as recited in claim 6, wherein the interface layer prevents the at least one other tag embedded within the webpage from executing.

8. The computer system as recited in claim 1, wherein one or more characteristics of the at least one other tag comprises an identity of the at least one tag.

9. The computer system as recited in claim 1, wherein determining that the at least one other tag is banned comprises confirming that the at least one other tag has a property of being: out of date, an insecure tag, or listed within a list of banned tags.

10. A computer-implemented method for using a master tag to monitor and control other tags on a webpage, comprising:
receiving communications generated by a master tag at a master tag server, wherein the master tag is embedded within a webpage;
identifying, with the embedded master tag, from the received communications one or more characteristics of at least one other tag embedded within the webpage;
determining that the at least one other tag is allowed to fire;
executing, from within the webpage, the at least one other tag, wherein the at least one other tag is configured to communication with an external server;
redirecting, from within the webpage, communication from the at least one other tag to a different server; and
allowing the at least one other tag embedded within the webpage to communicate with the external server.

11. The computer-implemented method as recited in claim 10, further comprising:
embedding one or more master tags on one or more identified webpages, wherein each embedded master tag constitutes part of a set of embedded master tags;
receiving communications generated by each of the embedded master tags in the set; and
generating a set of rules for a tag management system hosted at the master tag server.

12. The computer-implemented method as recited in claim 11, wherein the generated rules of the tag management system enables a website to automatically recreate each tag of each webpage hosted at the website without manual analysis or intervention.

13. The computer-implemented method as recited in claim 10, wherein manipulating the execution of the at least one other tag comprises preventing the at least one other tag from executing.

14. The computer-implemented method as recited in claim 13, wherein preventing the at least one other tag from executing comprises injecting a segment of code into a source code of the at least one other tag.

15. The computer-implemented method as recited in claim 13, wherein preventing the at least one other tag from executing comprises deleting at least a portion of a source code corresponding to the at least one other tag.

16. The computer-implemented method as recited in claim 10, wherein determining that the at least one other tag is allowed to fire comprises confirming that the at least one other tag has a property of being: a current tag, a secure tag, or unlisted within a list of banned tags.

17. The computer-implemented method as recited in claim 9, wherein the executable instructions include instructions that are executable to configure the computer system to implement an interface layer through which the webpage is rendered, wherein the interface layer is implemented by the executed master tag.

18. The computer-implemented method as recited in claim 17, wherein the interface layer allows the at least one other tag embedded within the webpage to execute.

19. The computer-implemented method as recited in claim 9, wherein one or more characteristics of the at least one other tag comprises an identity of the at least one tag.

20. A computer system for using a master tag to monitor and control other tags on a webpage, comprising:
one or more processors; and
one or more computer-readable media having stored thereon executable instructions that when executed by the one or more processors configure the computer system to perform at least the following:
receive communications generated by a master tag at a master tag server, wherein the master tag is embedded within a webpage;
identify, with the embedded master tag, from the received communications one or more characteristics of at least one other tag embedded within the webpage;
determine that the at least one other tag is allowed to fire;
execute, from within the webpage, the at least one other tag, wherein the at least one other tag is configured to communicate with an external server;
redirect, from within the webpage, communications from the at least one other tag to a different server; and
allow the at least one other tag embedded within the webpage to communicate with the external server.

* * * * *